(12) United States Patent
Samuelson

(10) Patent No.: US 12,421,742 B2
(45) Date of Patent: Sep. 23, 2025

(54) METHOD AND APPARATUS FOR APPLYING AN ARCHITECTURAL LAYOUT TO A SURFACE

(71) Applicant: JZ Technologies, LLC, Cincinnati, OH (US)

(72) Inventor: Jeffrey Samuelson, Cincinnati, OH (US)

(73) Assignee: JZ Technologies, LLC, Cincinnati, OH (US)

( * ) Notice: Subject to any disclaimer, the term of this patent is extended or adjusted under 35 U.S.C. 154(b) by 651 days.

(21) Appl. No.: 17/841,899

(22) Filed: Jun. 16, 2022

(65) Prior Publication Data
US 2023/0003038 A1    Jan. 5, 2023

Related U.S. Application Data

(60) Provisional application No. 63/216,728, filed on Jun. 30, 2021.

(51) Int. Cl.
*E04G 19/00*    (2006.01)
*G01C 15/00*    (2006.01)

(52) U.S. Cl.
CPC ......... *E04G 19/00* (2013.01); *G01C 15/004* (2013.01)

(58) Field of Classification Search
CPC .... E04G 19/00; E04G 21/1841; G01C 15/004
See application file for complete search history.

(56) References Cited

U.S. PATENT DOCUMENTS

| | | | | |
|---|---|---|---|---|
| 2,527,019 A | * | 10/1950 | Marbury, Jr. | B23K 7/004 409/206 |
| 4,899,457 A | * | 2/1990 | Fergus | G01B 5/207 33/286 |
| 4,934,063 A | * | 6/1990 | Speisser | G01B 7/28 33/645 |
| 6,877,236 B1 | * | 4/2005 | Williams | G01C 15/002 33/286 |
| 7,336,078 B1 | | 2/2008 | Merewether et al. | |
| 7,875,828 B2 | * | 1/2011 | Jung | B23K 26/0676 219/121.79 |
| 7,984,562 B2 | * | 7/2011 | Redmond | G01B 5/0023 33/1 G |
| 8,595,946 B2 | | 12/2013 | Hayes et al. | |
| 9,251,624 B2 | | 2/2016 | Ito et al. | |

(Continued)

*Primary Examiner* — Peter J Macchiarolo
*Assistant Examiner* — Tania Courson
(74) *Attorney, Agent, or Firm* — Taft Stettinius & Hollister LLP

(57) ABSTRACT

Apparatuses and methods for accurately applying an architectural layout to a surface. A calibration system includes a calibration rig having a plurality of vertical calibration legs assembled with a plurality of horizontal calibration legs and a laser that emits one or more beams of light onto a work surface to position the architectural layout relative to the calibration rig on the work surface. Calibration markers are positioned at intersections of the vertical and horizontal calibration legs for the laser to scan and confirm calibration accuracy of each of the calibration markers. The calibration markers calibrate the laser by using fixed, known points on the calibration grid that can be folded, collapsed, disassembled, and/or rolled for easy transport to other locations. The work surface can include obstacles and/or be uneven.

14 Claims, 14 Drawing Sheets

(56) References Cited

U.S. PATENT DOCUMENTS

| | | |
|---|---|---|
| 10,089,530 B2 | 10/2018 | Loveland et al. |
| 10,317,184 B1 * | 6/2019 | Keller |
| 10,466,027 B2 * | 11/2019 | Yokoyama ........... H04N 17/002 |
| 10,538,927 B1 | 1/2020 | Keller |
| 2009/0257069 A1 | 10/2009 | Rueb et al. |
| 2010/0303300 A1 | 12/2010 | Svanholm |
| 2013/0314688 A1 | 11/2013 | Likholyot |

* cited by examiner

METHOD AND APPARATUS FOR APPLYING AN ARCHITECTURAL LAYOUT TO A SURFACE

CROSS-REFERENCE TO RELATED APPLICATION

The present application claims the benefit of the filing date of U.S. Provisional Application No. 63/216,728 filed on Jun. 30, 2021, which is incorporated herein by reference.

FIELD OF THE INVENTION

The present disclosure generally relates to a projection of an architectural layout onto a work surface and specifically to a calibration system to assist with accurately locating the projection of the architectural layout on the work surface.

BACKGROUND OF THE DISCLOSURE

Construction templates for residential and non-residential building constructions to map the location of construction materials is known. One example of a construction template includes adhering one or more templates onto a surface of a building slab. These templates are rolled onto the flat building slab in a side-by-side orientation, however if there are objects extending vertically from the surface of the building slab then these objects interfere with the placement of the templates. These templates are not suitable for surface conditions that are not flat. Attachment and positioning of the templates onto the building slabs is labor intensive, time consuming, challenging, and therefore expensive. Moreover, the placement of the construction templates is often not accurate which leads to misplacement of construction materials when following the construction templates that are not positioned accurately. Misplaced construction materials will eventually need to be fixed and relocated and/or replaced before the construction job is complete which leads to additional costs to correct the problem. The construction templates are single-use, which also increases the cost, and waste as new templates must be made for additional construction jobs.

There remains a significant unmet need for the unique apparatuses, methods, systems, and techniques disclosed herein.

BRIEF SUMMARY OF THE DISCLOSURE

Unique apparatuses, methods, and systems are disclosed for a calibration system including a calibration rig and a laser. Beneficially, the calibration system can easily be transported and set up in various field or construction conditions. The calibration system can be used for any layout purpose, even those not construction related such as equipment in a facility, retail kiosks at a store, to name a few. The calibration rig includes calibrated, flexible or rigid components, that are collapsible, and transportable such as in a standard van, automobile, or vehicle. The calibration system specifically calibrates the laser by using fixed, known points on the calibrated, flexible or rigid components that expand or assemble together to form a calibration grid usable at a first site and can later be folded, collapsed, and or rolled, for easy transport to a second site. The calibration system is portable and re-useable so that it can be moved from site to site fluidly and with limited downtime, and can be quickly setup at a new location. The calibration system can be used in diverse locations and conditions such as on a work surface that is not flat. The calibration system can include a spacer for exact spacing of the flexible or rigid components. The calibration system can include one or more calibration or control markers.

The calibration rig includes a plurality of reflective calibration locators that are positioned on the calibration grid at the known points that correspond to a calibration file that is accessible by the laser. The laser scans the plurality of reflective calibration locators positioned at the known points to determine actual calibration locations of the calibration locators. The laser reads the actual calibration locations of the calibration locators and compares the actual calibration locations of the calibration locators to predetermined calibration locations of the calibration locators that are found in the calibration file. The predetermined calibration locations are an exact location of the position in which the calibration locators should be placed. The laser scans all of the calibration locators that are positioned on the joint locations to determine a calibration accuracy at each of the calibration locators. Thereafter the laser can be calibrated by using the calibration accuracies of the calibration grid. The calibration accuracies are a comparison between the actual calibration locations and the corresponding predetermined calibration locations.

Moreover, the work surface may contain obstacles or may be uneven which does not affect the calibration system as it can be installed on the work surface to avoid the obstacles and operate without any issues. The problem of projecting an accurate architectural layout with limited reference points is solved with the disclosed calibration system. The problem of projecting an accurate architectural layout onto a work surface that includes obstacles and/or uneven surface is solved with the present calibration system. The projected architectural layout is projected at full scale or size onto the work surface. It should be appreciated that more than one architectural layout can be projected onto the work surface wherein the additional architectural layouts can represent different layers of materials or elements for installation on the work surface.

In one embodiment, a calibration rig comprising: a plurality of vertical calibration legs; a plurality of horizontal calibration legs; and a plurality of calibration joint locators, wherein each of the calibration joint locators includes a first groove that intersects a second groove at a 90 degree angle, the first and the second grooves each sized to receive at least one of the plurality of the vertical legs and/or at least one of the plurality of horizontal legs.

In one aspect of the one embodiment, the calibration rig further comprising one or more control point inserts for assembly with one or more of the plurality of calibration joint locators.

In one aspect of the one embodiment, the control point insert includes a reflective calibration marker.

In one aspect of the one embodiment, the control point insert includes a bottom surface that is configured to attach to a work surface.

In one aspect of the one embodiment, one or more of the plurality of vertical calibration legs and one or more of the plurality of horizontal calibration legs are assembled with the plurality of calibration joint locators to form a calibration rig that is movable relative to the one or more control point inserts attached to the work surface.

In one aspect of the one embodiment, the control point insert includes a raised surface marker that is defined by a control angle, wherein the control angle is measured relative to a control horizontal surface and a control angled surface of the control point insert.

In one aspect of the one embodiment, the control angle is between 22 and 60 degrees.

In one aspect of the one embodiment, the raised surface marker is rotated relative to a front side of the control point insert.

In one aspect of the one embodiment, the angle of rotation relative to the front side is between 22 and 60 degrees.

In one aspect of the one embodiment, one of the plurality of vertical calibration legs or one of the plurality of horizontal calibration legs is assembled with one of the plurality of calibration joint locators.

In one aspect of the one embodiment, further comprising: a calibration wedge for assembly with one or more of the plurality of calibration joint locators.

In a second embodiment, a calibration rig comprising: a plurality of calibration legs, the calibration legs are configured for assembly relative to one another to form a 90 degree angle between two of the calibration legs at a joint location; and a plurality of calibration joint locators wherein one of the calibration joint locators is positioned at one or more of the joint locations where two or more of the plurality of calibration legs are assembled.

In the second embodiment, further comprising: wherein each of the plurality of calibration joint locators includes one or more joint locator holes; wherein each of the plurality of calibration legs includes one or more calibration leg holes positioned to align with the one or more joint locator holes when one of the plurality of calibration joint locators is assembled with one of the plurality of calibration legs; and a plurality of fasteners to assemble the plurality of calibration joint locators with the plurality of calibration legs.

In the second embodiment, each of the calibration joint locators includes a first groove that intersects a second groove at a 90 degree angle, the first and the second grooves each sized to receive at least one of the plurality of the calibration legs.

In the second embodiment, the calibration rig includes one or more control point inserts for assembly with one or more of the plurality of calibration joint locators.

In a third embodiment, a method comprising: positioning a calibration rig on a work surface, the calibration rig comprising a plurality of vertical calibration legs and a plurality of horizontal calibration legs, the plurality of vertical calibration legs assembled with the plurality of horizontal calibration legs at a plurality of calibration joint locators; positioning the plurality of vertical calibration legs at 90 degree angles to the plurality of horizontal calibration legs; and determining a calibration accuracy of each of the plurality of calibration joint locators with a laser.

In the third embodiment, each of the calibration joint locators includes a first groove that intersects a second groove at a 90 degree angle, the first and the second grooves each sized to receive at least one of the plurality of the vertical legs and/or at least one of the plurality of horizontal legs; and assembling one or more control point inserts with one or more of the plurality of calibration joint locators.

In the third embodiment, further comprising: attaching the one or more control point inserts to the work surface.

In the third embodiment, further comprising: moving the calibration rig relative to the one or more control point inserts attached to the work surface.

In the third embodiment, further comprising: positioning an architectural layout on the work surface relative to the calibration rig with the use of the laser.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF ILLUSTRATIVE EMBODIMENTS

Figure 1:
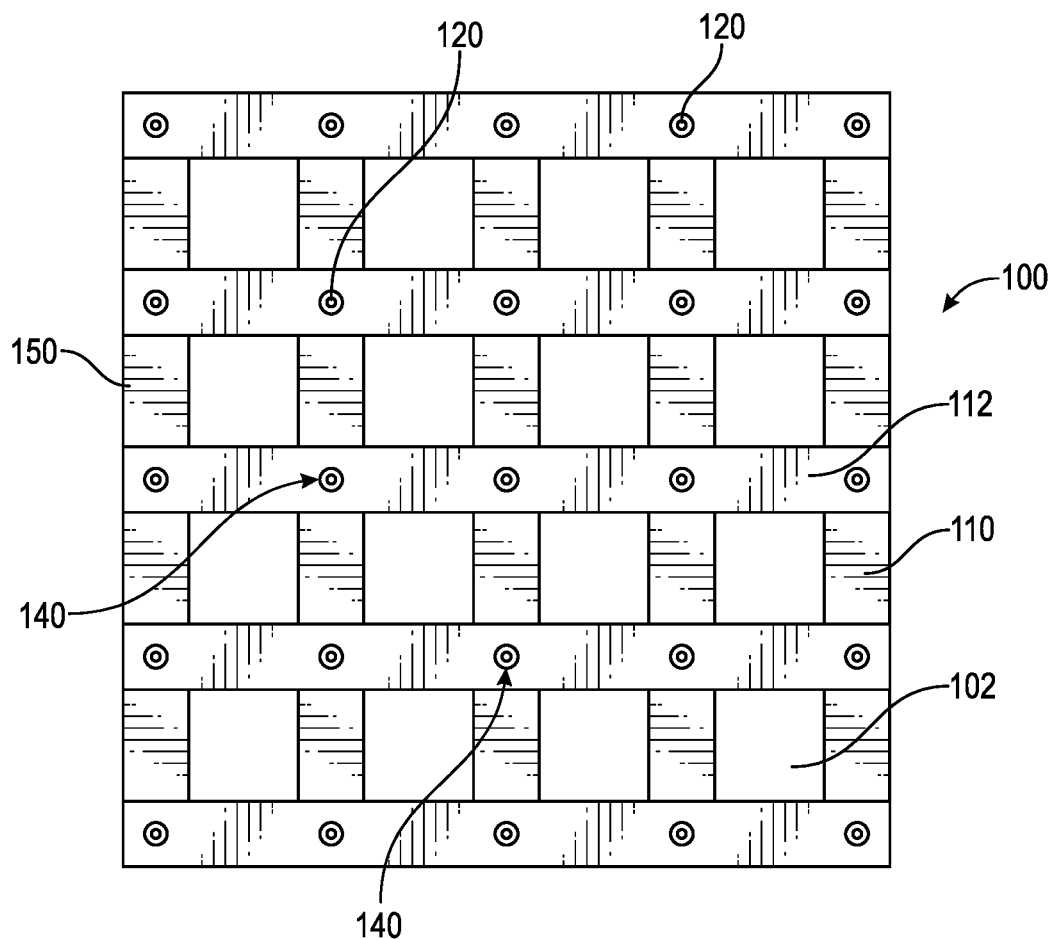
FIG. 1 is a schematic representation of a first embodiment of a prototype of a calibration rig in an expanded configuration.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
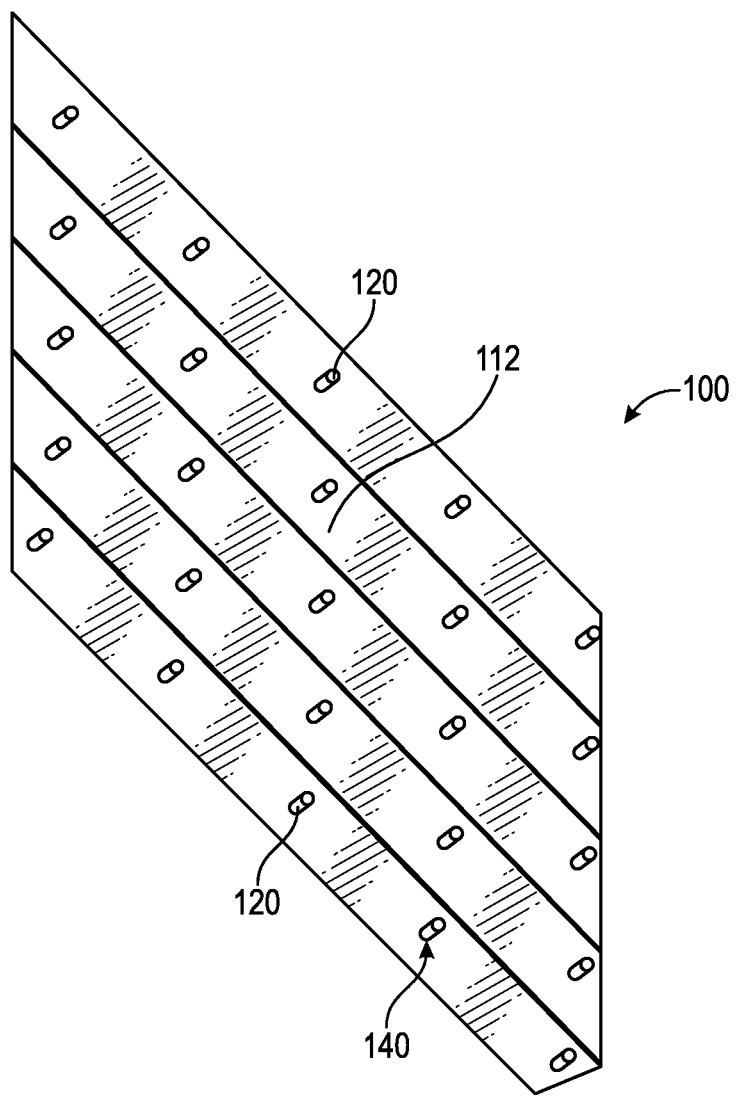
FIG. 2 is the calibration rig of FIG. 1 in a folded or collapsed configuration.

Referring now to the drawings wherein like reference characters identify corresponding or similar elements throughout the several views. With reference to FIGS. 1 and 2, is a schematic representation of a first embodiment of a prototype of a calibration rig 100. FIG. 1 illustrates the calibration rig 100 in an expanded configuration for use on a work surface 102. It is contemplated that work surface 102 includes a construction or jobsite floor or other layout purpose. FIG. 2 illustrates the calibration rig 100 in a folded or collapsed configuration for storage or transport such as in a vehicle between construction job sites. As such, the calibration rig 100 can be expanded and used at a first site or location and later the calibration rig 100 is collapsed and transported for use at a second site or location.

The calibration rig 100 includes a plurality of vertical calibration legs 110 and a plurality of horizontal calibration legs 112. The terms "vertical" and "horizontal" are for reference only and one of ordinary skill in the art would understand that the calibration rig 100 can be rotated such that the vertical calibration legs 110 are positioned horizontally and the horizontal calibration legs 112 are positioned vertically. Moreover, the terms "vertical" and "horizontal" are only for perspective relative to the Figures of the application. The plurality of vertical calibration legs 110 are connected to the plurality of horizontal calibration legs 112 at a plurality of target locations 120. The plurality of vertical calibration legs 110 are assembled with the plurality of horizontal calibration legs 112 so that one of the plurality of target locations 120 is positioned at the intersection of one of the vertical calibration legs 110 and one of the horizontal calibration legs 112. In one embodiment, each of the plurality of vertical calibration legs 110 includes a calibration hole 140 sized to receive one of the plurality of target locations 120 therein. Similarly in this one embodiment, each of the plurality of horizontal calibration legs 112 includes a calibration hole (not illustrated) sized to receive one of the plurality of target locations 120 therein. In this one embodiment, the plurality of vertical calibration legs 110 is assembled with the plurality of horizontal calibration legs 112 by aligning the corresponding calibration holes and assembling the plurality of target locations 120 in the corresponding calibration holes. In an expanded configuration for the calibration rig 100, the plurality of vertical calibration legs 110 are arranged at exact right or 90 degree angles to the plurality of horizontal calibration legs 112 to form a calibration grid 150 in FIG. 1. The plurality of target locations 120 are reflective calibration markers or dots that are scanned by a laser to determine a calibration accuracy as described below.

Figure 3:
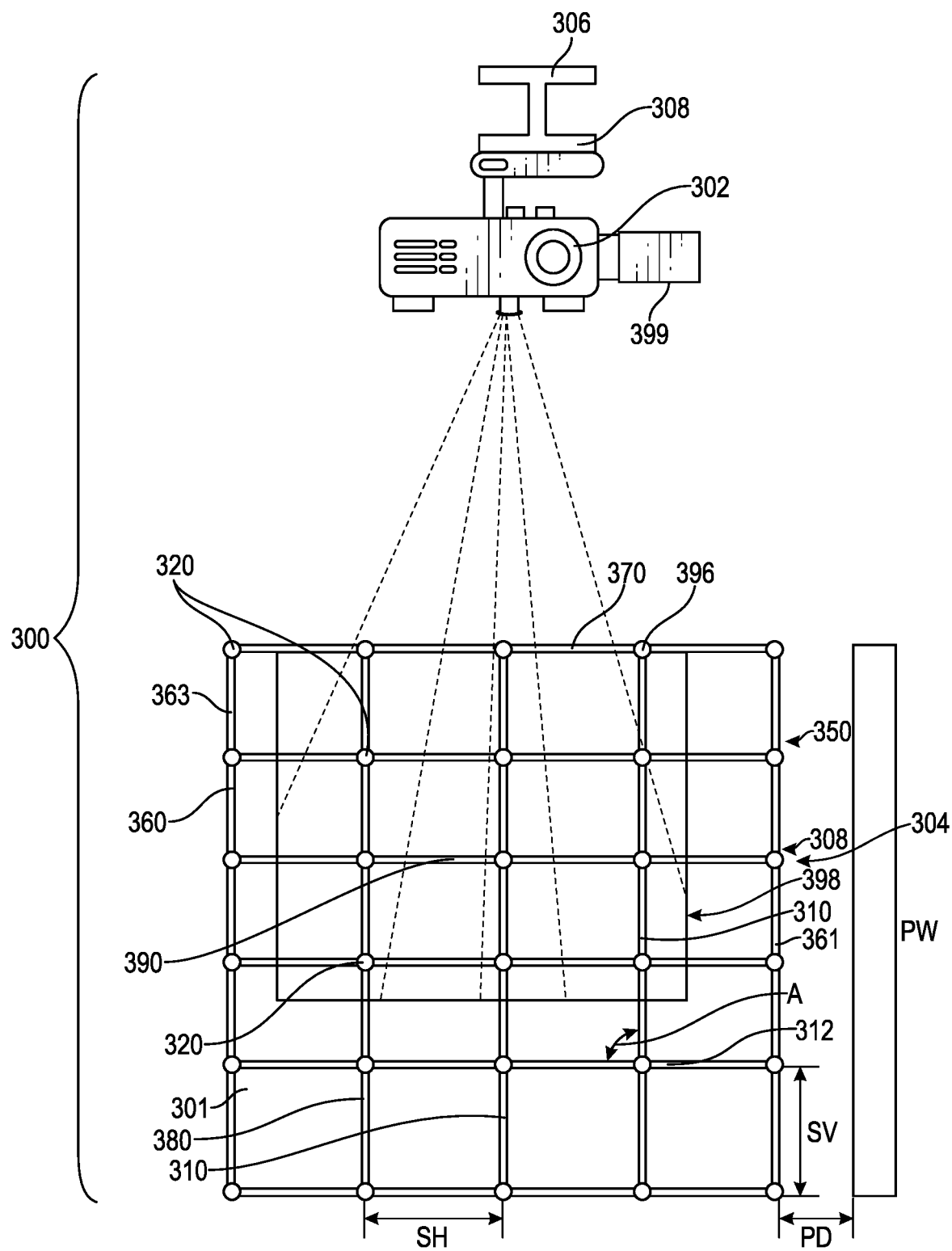
FIG. 3 is a top perspective view of a first embodiment of a calibration system in an expanded configuration.

Turning now to FIG. 3, a calibration system 300 in an expanded configuration on a work surface 301 is illustrated. The calibration system 300 includes a laser 302 and a calibration rig 304. The work surface 301 is vertically below an overhead structure wherein the work surface 301 is configured and sized to receive the calibration rig 304 thereon. The work surface 301 may be flat, uneven, non-parallel, and include objects such as pipes, electrical boxes, or other objects that extend above the work surface 301. The overhead structure can include a steel beam 306, ceiling, or other overhead support configured to receive the laser 302 thereon. In this embodiment, the laser 302 is mounted on a steel beam 306 using quick release mounts 308. In other embodiments, the laser 302 is mounted to a different type of overhead structure with other fastening devices used to mount the laser 302 thereon. In any embodiment, the laser 302 is detachable from the overhead structure such that the laser 302 can be transported to another construction site. Generally, the laser 302 is positioned above the calibration rig 304 or the laser 302 can be positioned at an angle relative to the calibration rig 304. As such, the laser 302 is not required to be directly above the calibration rig 304 but maybe offset a distance from the calibration rig 304. The laser 302, once calibrated, can shine on an angle to the floor.

The calibration rig 304 is similar to the calibration rig 100. The calibration rig 304 includes a plurality of vertical calibration legs 310 and a plurality of horizontal calibration legs 312. The plurality of vertical calibration legs 310 and the plurality of horizontal calibration legs 312 are assembled in a 5×5 square pattern on the work surface 301. As such, the calibration rig 304 includes five of the vertical calibration legs 310 and five of the horizontal calibration legs 312. In other embodiments, the vertical and horizontal calibration legs 310 and 312 may include additional legs or fewer legs.

In the illustrated form, the vertical and horizontal calibration legs 310 and 312 are made of bench tape measures. The bench tape measures are calibrated, flexible measuring tools without adhesive to avoid attachment to the work surface 301. In other embodiments, the vertical and horizontal calibration legs 310 and 312 are made of aluminum bars, steel, hardened steel, carbon fiber, plastic, and/or other metal materials or combination of these materials. The vertical and horizontal calibration legs 310 and 312 may be hinged, slotted, jointed, or hollow tubes to enable collapse, expansion, or adjustment of the vertical calibration legs 310 relative to the horizontal calibration legs 312. In another form, each of the vertical and horizontal calibration legs 310 and 312 are made of detachable or collapsible segments that facilitate collapse of the legs 310 and 312 for storage or transport between construction sites or locations. In this form, the detachable segments are assembled together to form the individual vertical and horizontal calibration legs 310 and 312, and thereafter the individual calibration legs 310 and 312 are coupled together at a plurality of joint locations 320 to form the calibration rig 304 for installation at a construction site on the work surface 301. Various types of fasteners, such as bolts, screws, pivoting mechanisms, or other types of fasteners, may be used at the plurality of joint locations 320 to enable attachment or connectivity between the individual vertical and horizontal calibration legs 310 and 312 to form a calibration rig 304.

The plurality of vertical calibration legs 310 are connected, attached, or intersect with the plurality of horizontal calibration legs 312 at the plurality of joint locations 320 wherein a spacing SV between two adjacent joint locations 320 is the same along the length of the vertical calibration legs 310. A spacing SH between two adjacent joint locations 320 is also the same along the length of the plurality of horizontal calibration legs 312. The plurality of vertical calibration legs 310 are assembled with the plurality of horizontal calibration legs 312 so that the spacing SV is equivalent to the spacing SH. In other forms, the plurality of vertical calibration legs 310 are assembled with the plurality of horizontal calibration legs 312 so that the spacing SV is not equivalent to the spacing SH. In the expanded configuration for the calibration rig 304, the plurality of vertical calibration legs 310 are arranged at right or 90 degree angles to the plurality of horizontal calibration legs 312 to form a calibration grid 350.

The plurality of vertical calibration legs 310 include perimeter vertical members 360 and the plurality of horizontal calibration legs 312 include perimeter horizontal members 370. The perimeter vertical members 360 connect with the perimeter horizontal members 370 at the joint locations 320 to form a square shape in the illustrated embodiment.

The plurality of vertical calibration legs 310 include interior vertical members 380 and the plurality of horizontal calibration legs 312 include interior horizontal members 390. The interior vertical members 380 are connected to the perimeter horizontal members 370 at the joint locations 320 such that a right angle or 90 degree angle exists between the interior vertical members 380 and the perimeter horizontal members 370 when the calibration rig 304 is in the expanded configuration. The interior horizontal members 390 are connected to the perimeter vertical members 360 at the joint locations 320 such that a right angle or 90 degree angle exists between the interior horizontal members 390 and the perimeter vertical members 360 when the calibration rig 304 is in the expanded configuration.

One embodiment of the laser 302 is illustrated in FIG. 3 but one of ordinary skill in the art would appreciate that other types of lasers can be used with the calibration rig 304. The laser 302 has scanning features and optionally 3-D laser scanning features. The laser 302 can be a smart laser capable of being programmed. Additionally, the projection area of the laser 302 may be larger than the calibration rig 304 in an expanded configuration. The projection area of the laser 302 contains the work surface 301 when the laser 302 is positioned above it or near the work surface 301.

Installation of the calibration system 300 will now be described. The laser 302 is mounted on the steel beam 306 using quick release mounts 308. In one embodiment, the calibration rig 304 is positioned on the work surface 301 directly under the laser 302. In another embodiment, the calibration rig 304 is positioned on the work surface 301 a distance offset laterally from the laser 302. In one embodiment, a single dot or beam of light from the laser 302 is used to position or adjust the location of the calibration rig 304. The laser 302 projects a single dot or beam of light onto the work surface 301 so that the calibration rig 304 can be positioned on the work surface 301 and located below the laser 304. In other embodiments, the calibration rig 304 is located adjacent to the laser 304. Optionally, the calibration rig 304 can be placed without use of the laser 302 such that the laser 302 is positioned close to the work surface 301 after the calibration rig 304 is installed.

Next one edge of the calibration rig 304 is squared to the work surface 301 using the laser 302 and a parallel wall PW or other parallel surface that extends parallel to the work surface 301. A parallel distance PD between the closest perimeter vertical members 360 and the parallel wall PW or parallel surface is measured to square or position the perimeter vertical members 360 at an equal spacing from the parallel wall PW. In FIG. 3, the corresponding perimeter vertical members 360 that are closest to the parallel wall are designated 361. The laser 302 can project a line of light on the work surface 302 to enable a worker to position the perimeter vertical members 361 that are closest to the parallel wall at an equal spacing or the parallel distance PD from the parallel wall. In other embodiments, the laser 302 is not used to position the perimeter vertical members 361. The remaining vertical calibration legs 310 and the horizontal calibration legs 312 are positioned relative to the closest perimeter vertical members 361 as described below. In an alternative embodiment, the perimeter vertical members 360 that are farthest from the parallel wall PW are squared or positioned at an equal spacing or the parallel distance PD from the parallel wall PW and the remaining vertical calibration legs 310 and the horizontal calibration legs 312 are positioned relative to the farthest perimeter vertical members 360. The perimeter vertical members 360 that are farthest from the parallel wall PW are designated 363. In one embodiment, the laser 302 measures the distance from the perimeter vertical members 361 or 363 and verifies that the perimeter vertical members 361 or 363 are accurately positioned. If the perimeter vertical members 361 or 363 are not accurately positioned, then the members 361 or 363 are adjusted.

Next, to square the calibration rig 304 to the work surface 301, all of the plurality of vertical calibration legs 310 and the plurality of horizontal calibration legs 312 are positioned at 90-degree angles to each other. The remaining perimeter vertical and horizontal members 360 and 370 are squared such that the remaining perimeter vertical members 360 are placed at right or 90 degree angles to the perimeter horizontal members 370. The interior vertical members 380 of the plurality of vertical calibration legs 310 and interior horizontal members 390 of the plurality of horizontal calibration legs 312 are squared or positioned relative to each other at right angles or 90 degree angles. The interior vertical members 380 are positioned relative to perimeter horizontal members 370 such that a right angle or 90 degree angle exists between the interior vertical members 380 and the perimeter horizontal members 370. The interior horizontal members 390 are positioned relative to the perimeter vertical members 360 such that a right angle or 90 degree angle exists between the interior horizontal members 390 and the perimeter vertical members 360.

There are many techniques in which the plurality of vertical calibration legs 310 and the plurality of horizontal calibration legs 312 can be placed or positioned in 90 degree angles. One technique includes using precisely measured calipers. In particular, the Pythagorean Theorem, $A^2+B^2=C^2$, is used to calculate the diagonal, C, that is also measured by the calipers wherein the length of one of the vertical calibration legs 310 is 'A' and the length of the adjacent one of the horizontal calibration legs 312 is 'B'. Since the lengths of the vertical calibration legs 310 and the horizontal calibration legs 312 are known, then the caliper is set to measure the diagonal, C, to facilitate placement of the vertical calibration legs 310 to the horizontal calibration legs 312 to form 90 degree angles between the vertical and horizontal calibration legs 310 and 312. For example, if the A and B lengths of the vertical calibration legs 310 and the horizontal calibration legs 312 are 4', then to position the vertical calibration legs 310 at 90 degree angles to the horizontal calibration legs 312 or vice versa then diagonal, C, is 5.657'. In this example, if the caliper measures C at 5.657', then the adjacent vertical and horizontal calibration legs 310 and 312 are positioned at a 90 degree angle relative to each other. Further in this example, if the measured diagonals, C, are not equal to 5.657' then one or more of the vertical or horizontal calibration legs 310 and 312 are adjusted or rotated relative to the other about the joint locations 320 until the measured diagonals, C, are equal to 5.657'. This method of measuring the diagonals, C, and adjusting or rotating the vertical and horizontal calibration legs 310 and 312 as required to obtain the correct measurement for diagonal C based upon the Pythagorean Theorem is repeated until all of the vertical and horizontal legs 310 and 312 are at 90 degrees to each other to form the calibration grid 350. In one embodiment, the diagonals, C, of the vertical and horizontal legs 310 and 312 are measured in a pattern that starts at an upper right and proceeds to a lower left of the calibration rig 304 and then the pattern proceeds from an upper left to a lower right of the calibration rig 304. If these diagonals, C, are the same, then there are 90 degree angles between the vertical and horizontal legs 310 and 312. Yet another technique to place the horizontal calibration legs 312 in proper relationship to the vertical calibration legs 310 includes using the laser 302.

Figure 4:
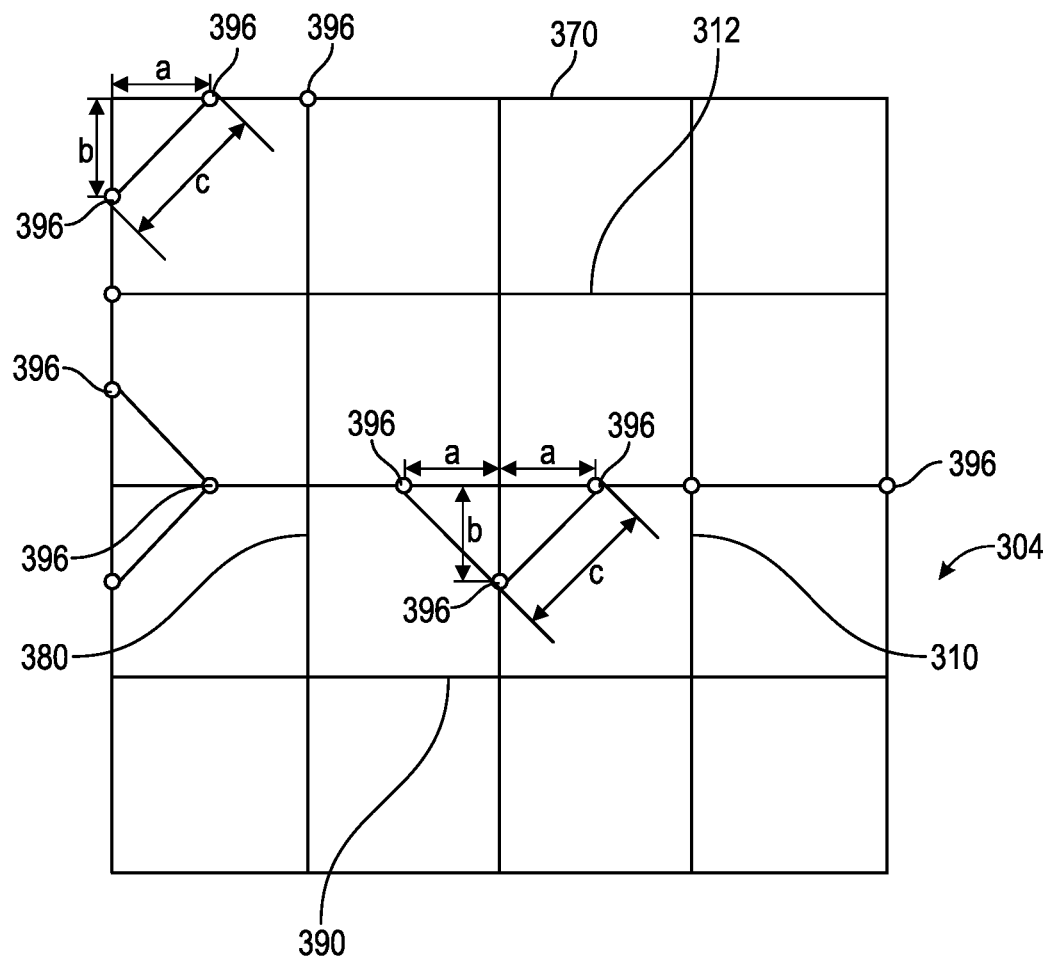
FIG. 4 is a schematic representation of the FIG. 3 embodiment.

A representative illustration of the formula of $A^2+B^2=C^2$ applied for the calibration rig 304 is shown in FIG. 4. In the illustration, A is 3 units, B is 4 units, and C is 5 units for the diagonal measurements. The units are measured in either the customary or metric system. The calibration rig 304 is schematically shown in FIG. 4 having a spacing SV of 6 feet and a spacing SH of 6 feet to form the calibration grid 350 being 24'×24' with five (5) of each of the plurality of vertical and horizontal legs 310 and 312.

After the plurality of vertical calibration legs 310 are positioned relative to the plurality of horizontal calibration legs 312 at right or 90-degree angles to each other, at each of the joint locations 320, a reflective calibration locator 396 is positioned. Alternatively, the reflective calibration locator 396 can be placed at the intersections of A, B, and C along the length of the respective one of the plurality of vertical and horizontal legs 310 and 312.

Figure 7:
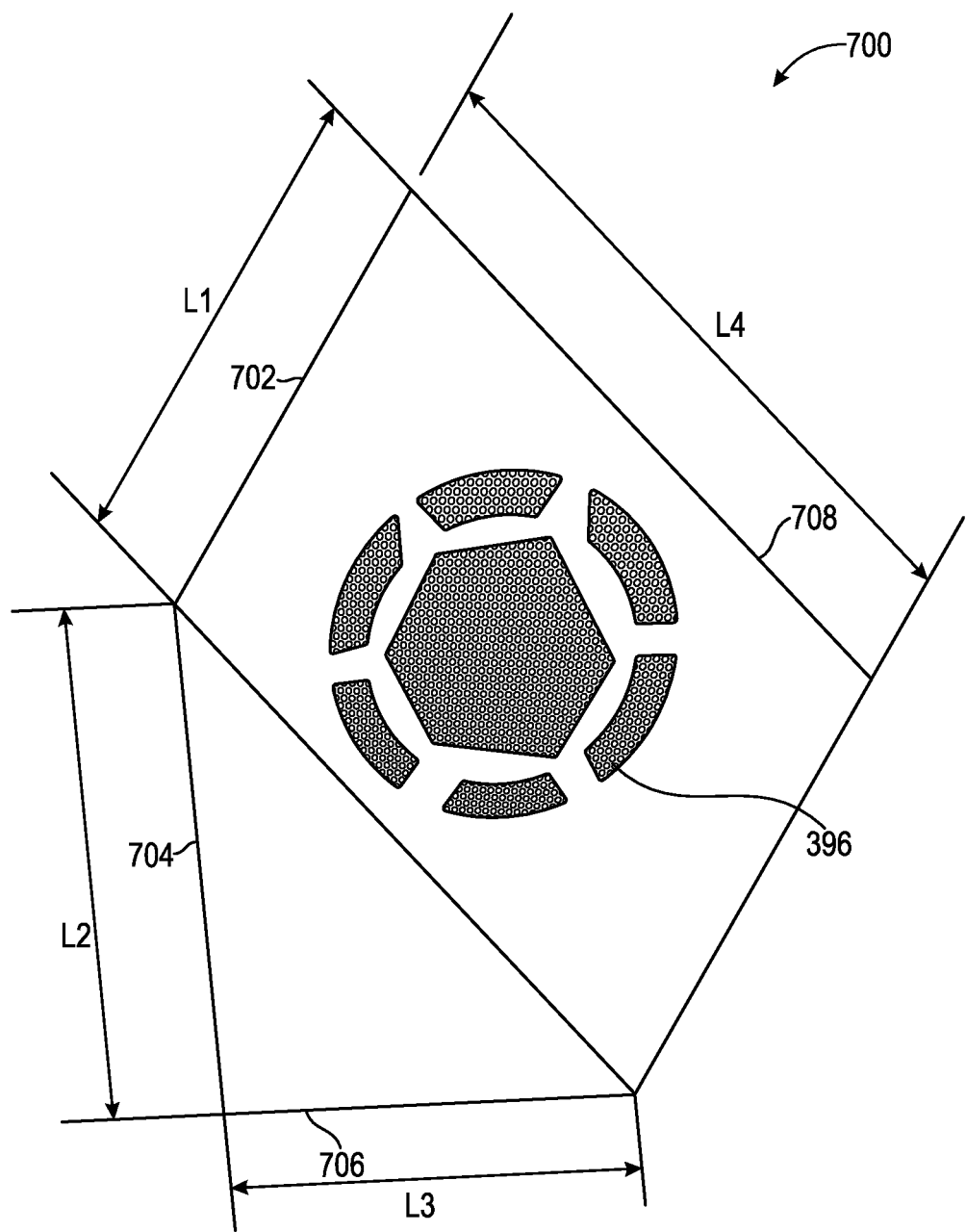
FIG. 7 is a perspective view of a calibration wedge that can be used with the calibration system of FIG. 3.

Optionally, one or more calibration wedges 700 as illustrated in FIG. 7 can be used at the joint locations 320 to either rest on top of the joint locations 320 or under the joint locations 320 to thereby support the joint location 320. Optionally, each of the calibration wedges 700 includes one of the reflective calibration locators 396. The calibration wedges 700 have a wedge or triangular shape and include a first lateral leg 702, a second longitudinal leg 704, a third vertical leg 706, and a hypotenuse leg 708. In the embodiment illustrated in FIG. 7, the first lateral leg 702 has a length, L1, of 0.25 inches, the second longitudinal leg 704 has a length, L2, of 0.25 inches, the third vertical leg 706 has a length, L3, of 0.25 inches, and the hypotenuse leg 708 has a length, L4, of 0.35355 inches.

For a calibration accuracy determination, the laser 302 scans the reflective calibration locators 396 to determine an actual calibration location. The laser 302 scans the calibration locators 396 after the locators 396 are positioned on the calibration grid 350. The laser 302 reads the actual calibration locations of the calibration locators 396 and compares the actual calibration locations of the calibration locators 396 to predetermined calibration locations of the calibration locators 396. The predetermined calibration locations are an exact location of the position in which the calibration locators 396 should be placed based on the joint locations 320 or the intersections of A, B, and C along the length of the respective one of the plurality of vertical and horizontal legs 310 and 312 that are positioned at exact 90 degree angles. For example, in a calibration grid 350 that is 7×7 there are 49 of the joint locations 320 wherein each of the joint locations 320 has a unique predetermined calibration location and a measured actual calibration location after the calibration locator 396 is placed on the joint locations 320. In this example, the calibration grid 350 includes the vertical and horizontal legs 310 and 312 that are positioned at 4'-0" on centers. For example, the first of the joint locations 320 has a first predetermined calibration location of x=0.000000, y=0.000000, and z=0.000000. The laser 302 scans the calibration locator 396 that is positioned on the first of the joint locations 320 and determines the first actual calibration location and a first calibration accuracy of the first calibration locator 396 that is the difference between the first predetermined calibration location and the first actual calibration location. A second of the joint locations 320 has a second predetermined calibration location of x=0.000000, y=4.000000, and z=0.000000. The laser 302 scans the calibration locator 396 that is positioned on the second of the joint locations 320 and reads the second actual calibration location to determine a second calibration accuracy of the second calibration locator 396 that is the difference between the second predetermined calibration location and the second actual calibration location. A third of the joint locations 320 has a third predetermined calibration location of x=0.000000, y=8.000000, and z=0.000000. The laser 302 scans the calibration locator 396 that is positioned on the third of the joint locations 320 and reads the third actual calibration location to determine a third calibration accuracy of the third calibration locator 396 that is the difference between the third predetermined calibration location and the third actual calibration location. The laser 302 scans all of the calibration locators 396 that are positioned on the joint locations 320 to determine a calibration accuracy at each of the calibration locators 396. Thereafter the laser 302 can be calibrated by using the calibration accuracies of the calibration grid 350. In the embodiment illustrated in FIG. 3, the laser 302 determined a calibration accuracy of 0.002 feet or 0.024 inches, or 0.6096 mm. The first, second, and third calibration accuracies are a comparison between the actual calibration locations and the corresponding predetermined calibration locations. The laser's scan and computation is directly related to the placement of the target locations 120, reflective calibration locators 396 at the joint locations 320, and reflective calibration locators 995, as described below.

As another technique for calibration accuracy determination, the laser 302 projects a square beam of light or laser projection 398 onto the work surface 301. In this technique, the calibration accuracy determination measures the projected beam of light of the laser 302 on the work surface 301 wherein the accuracy is measured at a certain distance at a specific range. In the illustrated embodiment in FIG. 3, the square beam of light or laser projection 398 is 48"×48" and the laser projection 398 was accurate to less than ⅛₃₂" in 48". The laser projection 398 is accurate to within the thickness of the beam of light from the laser 302 with a tolerance of less than 1 mm.

In another embodiment, the calibration rig 304 includes seven (7) of the plurality of vertical calibration legs 310 and seven (7) of the plurality of horizontal calibration legs 312 to form the calibration grid 350 being a 24'×24' grid in a 7×7 pattern such that the spacing SV between two of the vertical calibration legs 310 and the spacing SH between two of the horizontal calibration legs 312 are each 4 feet. In this embodiment, the plurality of vertical calibration legs 310 and the plurality of horizontal calibration legs 312 are ¾" wide tape measures. The reflective calibration locators 396 are placed at 4' centers each way and at the intersections of the plurality of vertical calibration legs 310 and the plurality of horizontal calibration legs 312. In this embodiment, the projection area of the laser 302 is 30'×30' and the calibration rig 350 is 24'×24' which assures accuracy across the entire projection area of the laser 302. The accuracy across the entire projection area of the laser 302 is improved when additional points or reflective calibration locators 396 are scanned.

Figure 5:
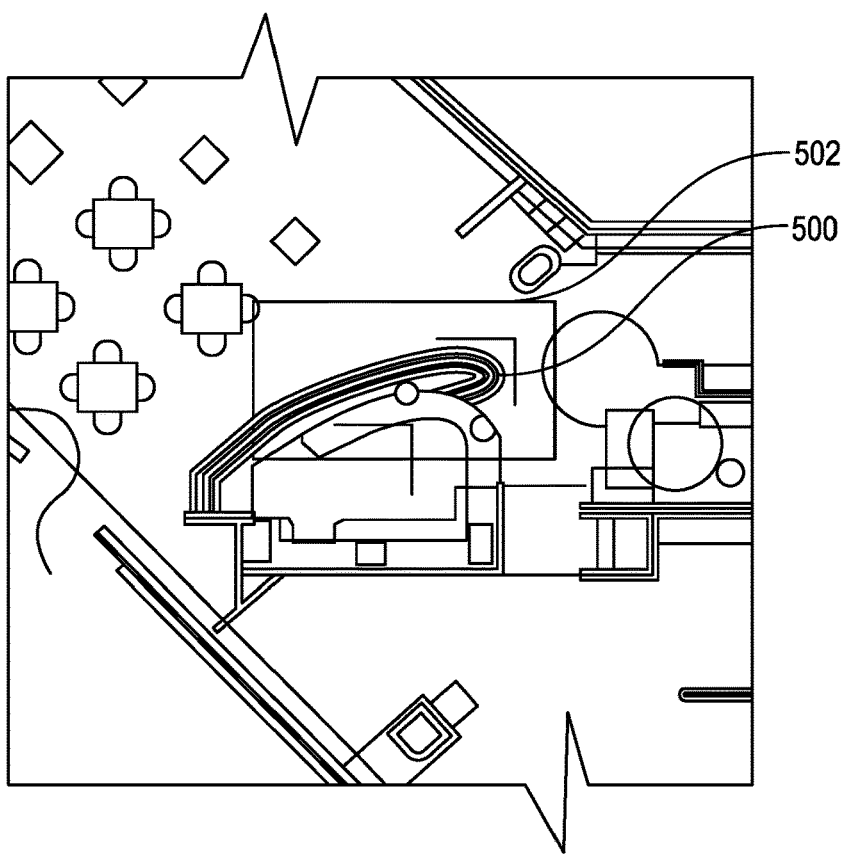
FIG. 5 is an exemplary partial view of an architectural layout for projection by the laser in FIG. 3.
Figure 6:
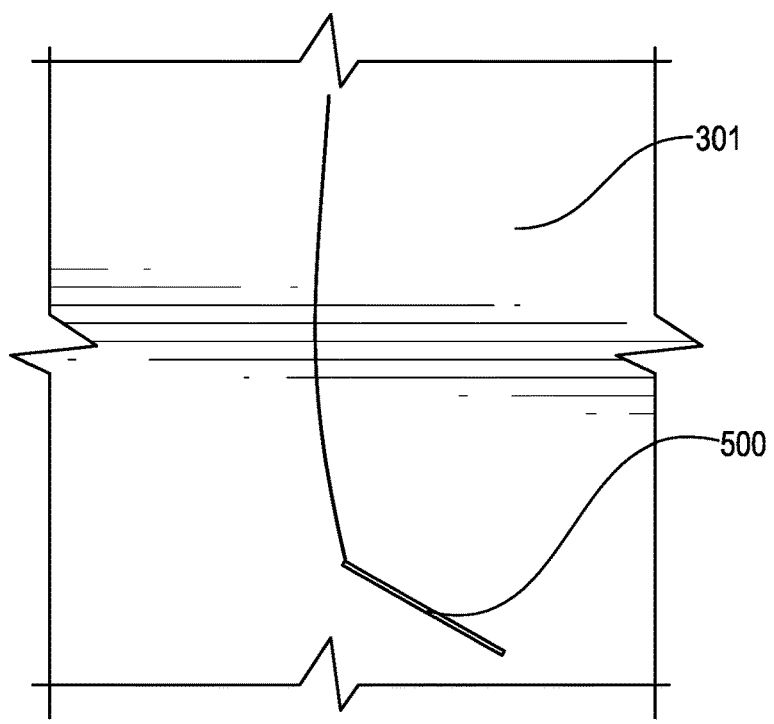
FIG. 6 is a partial view of the exemplary architectural layout from FIG. 5 by the laser in FIG. 3 onto a work surface.

After the laser 302 is calibrated, an architectural layout can be projected and accurately placed by the laser 302 on the work surface 301 relative to the calibration rig 304. The architectural layout includes any shape that is desired to be built or installed on the work surface 301. The architectural layout is projected at full scale or size onto the work surface 301. It should be appreciated that more than one architectural layout can be projected onto the work surface 301 wherein the additional architectural layouts can represent different layers of materials or elements for installation on the work surface 301. FIG. 5 illustrates one embodiment of a partial view of an architectural layout 500 that can be projected by the laser 302 as a beam of light onto the work surface 301. The projection area 502 of the laser 302 is illustrated to show the architectural layout 500 relative to the projection area 502. FIG. 6 illustrates a portion of the architectural layout 500 on the work surface 301 from FIG. 5.

In certain embodiments, the laser 302 is coupled to a controller 399 structured to perform certain operations to control operation of the laser 302. In certain embodiments, the controller 399 forms a portion of a processing subsystem including one or more computing devices having memory, processing, and communication hardware. The controller 399 may be a single device or a distributed device, and the functions of the controller 399 may be performed by hardware or by instructions encoded on computer readable medium. The controller 399 may be included within, partially included within, or completely separated from the laser 302.

In certain embodiments, the controller 399 is described as functionally executing certain operations. The descriptions herein including the controller operations emphasizes the structural independence of the controller 399, and illustrates one grouping of operations and responsibilities of the controller 399. Other groupings that execute similar overall operations are understood within the scope of the present application. Aspects of the controller 399 may be implemented in hardware and/or by a computer executing instructions stored in non-transient memory on one or more computer readable media, and the controller 399 may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields.

Certain operations described herein include operations to interpret or determine one or more parameters. Interpreting and determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 8:
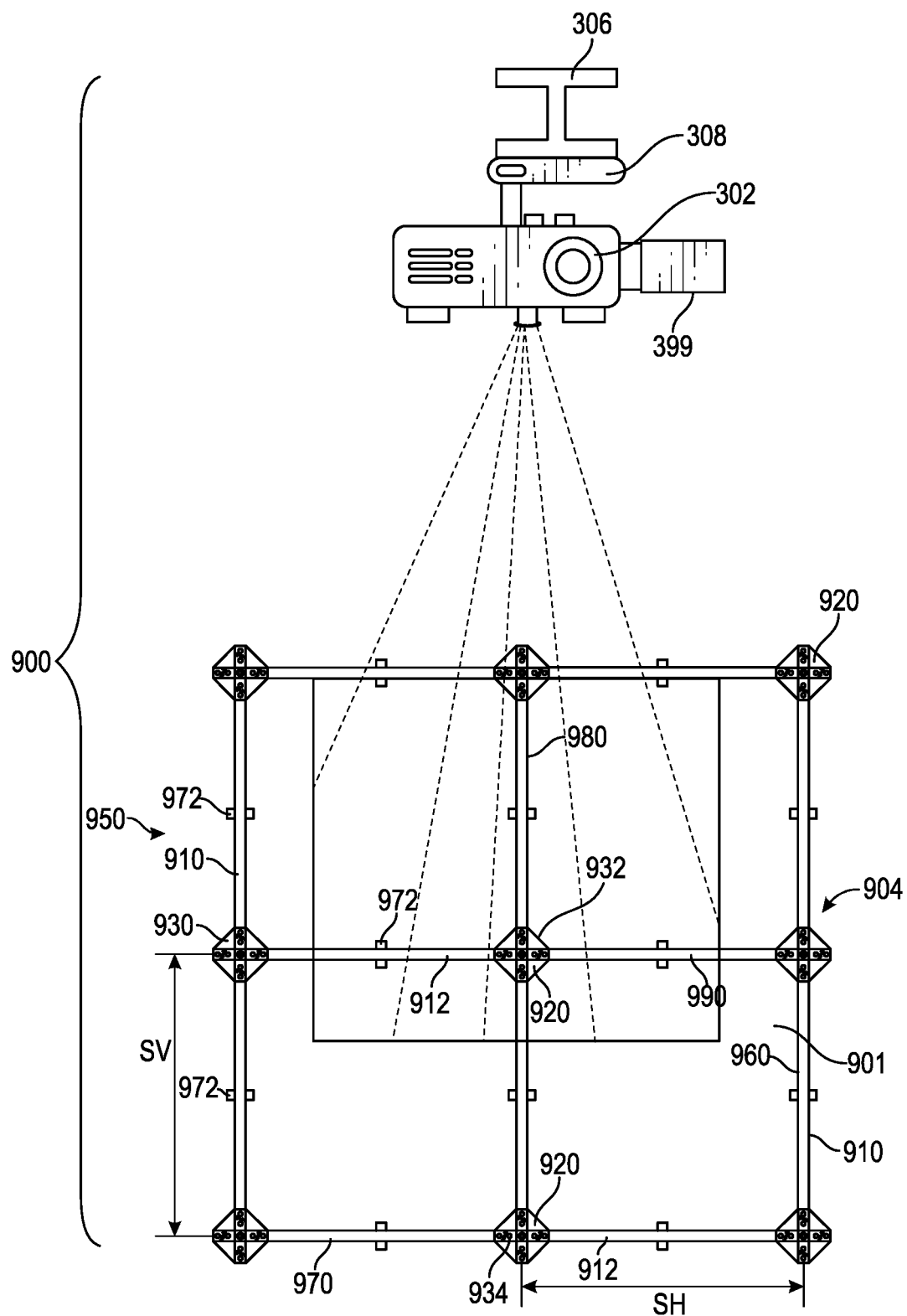
FIG. 8 is a top perspective view of a second embodiment of a calibration system in an expanded configuration.

Turning now to FIG. 8, a work surface 901 is configured and sized to receive a calibration rig 904 thereon. The work surface 901 is similar to work surface 301, therefore is not described. Above the work surface 901, can be an overhead structure such as a steel beam, ceiling, or other overhead support configured to receive the laser 302. The laser 302, once calibrated, is usable with a calibration rig 904.

The calibration rig 904 is similar to the calibration rig 304. The calibration rig 904 includes a plurality of vertical calibration legs 910 and a plurality of horizontal calibration legs 912. The plurality of vertical calibration legs 910 and the plurality of horizontal calibration legs 912 are assembled in a 2×2 square pattern on the work surface 901. As such, the calibration rig 904 includes three of the vertical calibration legs 910 and three of the horizontal calibration legs 912. In other embodiments, the vertical and horizontal calibration legs 910 and 912 may include additional legs or fewer legs.

Figure 9:
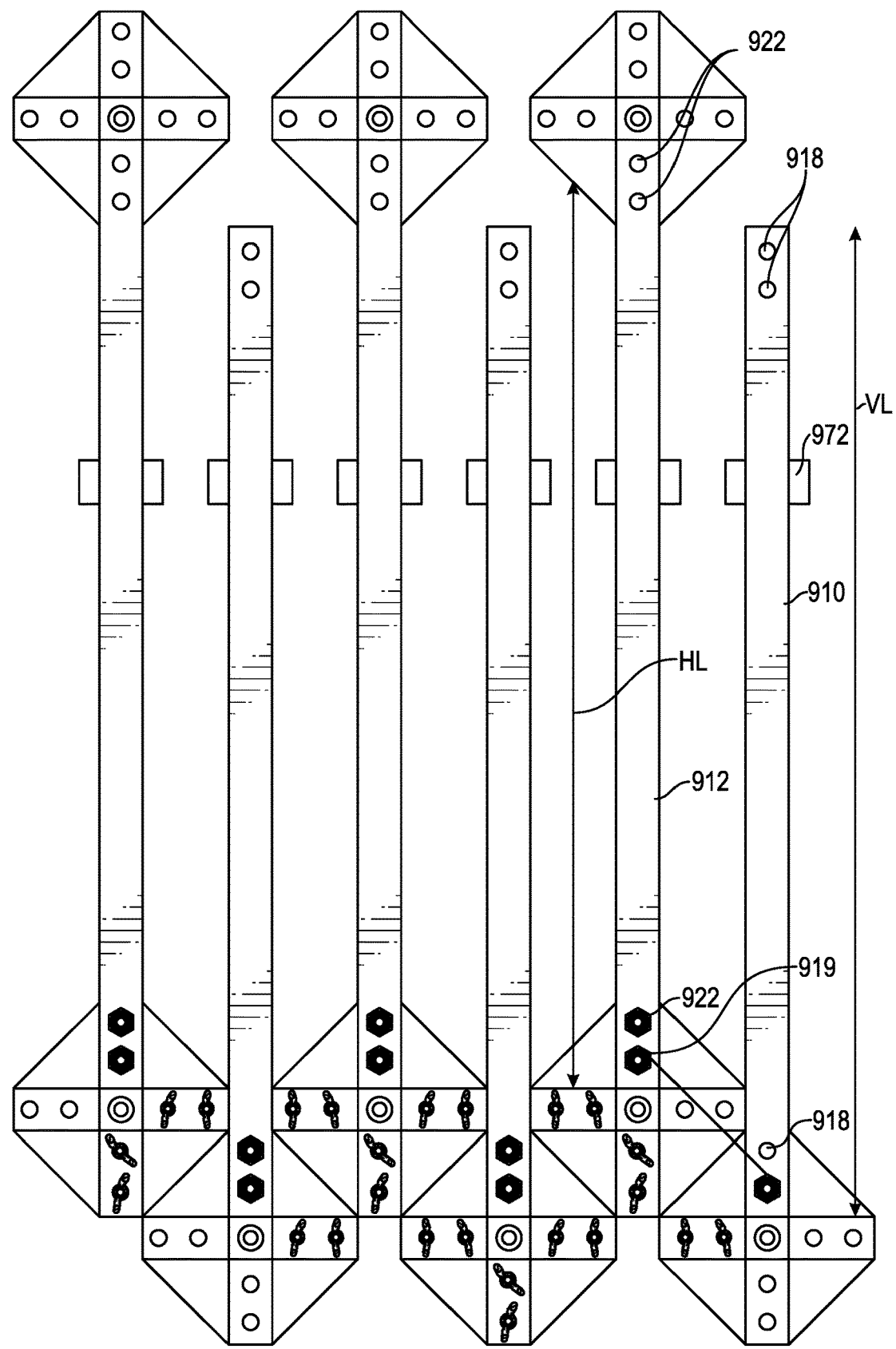
FIG. 9 is a top view of the unassembled vertical and horizontal calibration legs of the second embodiment of the calibration system of the FIG. 8 embodiment.
Figure 10:
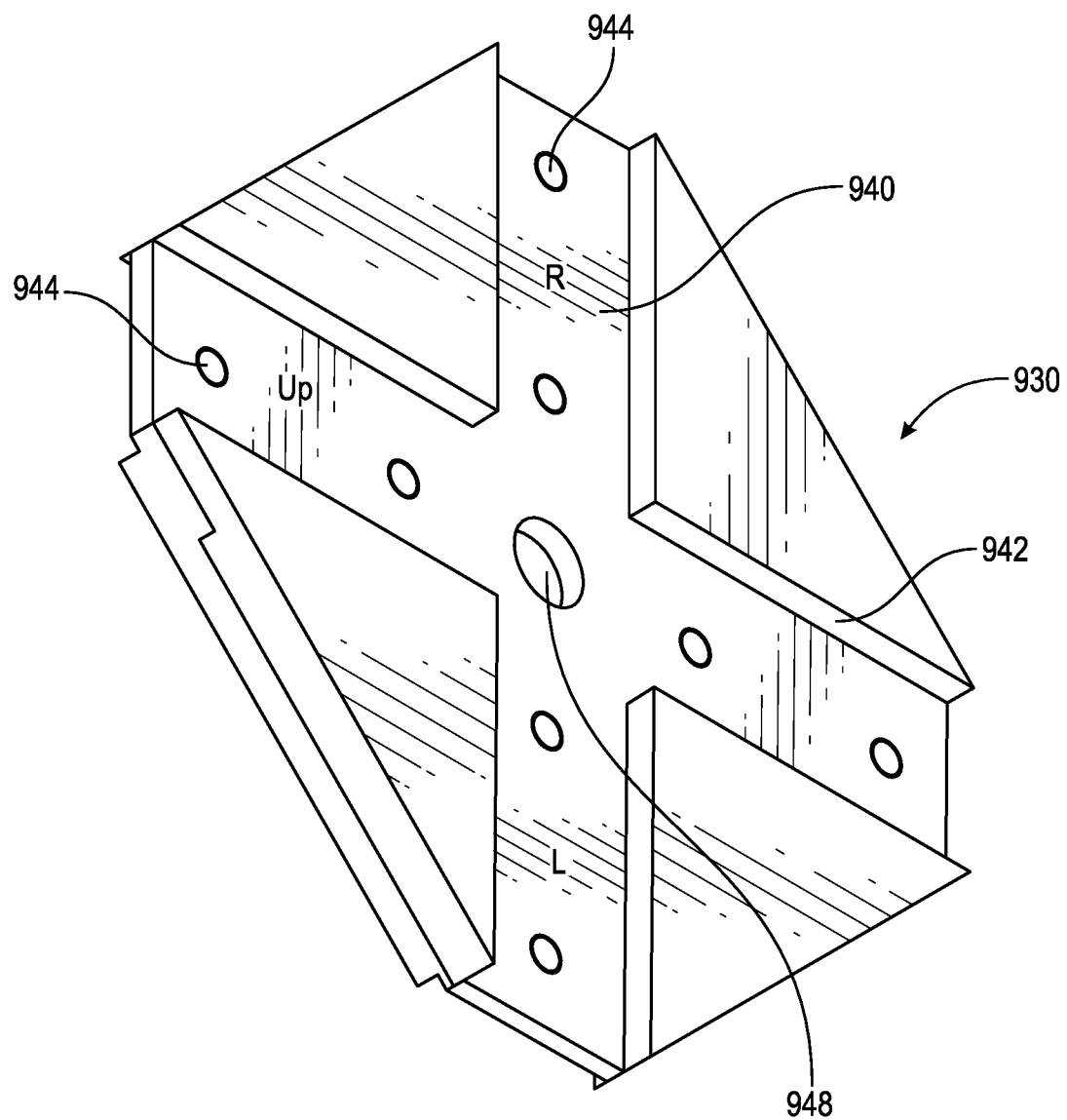
FIG. 10 is a perspective view of a first calibration joint locator.

In the illustrated form, the vertical and horizontal calibration legs 910 and 912 are made of metal bars. In other embodiments, the vertical and horizontal calibration legs 910 and 912 are made of aluminum or steel bars, plastic, and/or other metal material. Illustrated in FIG. 9 are the vertical and horizontal calibration legs 910 and 912 unassembled from each other. As can be appreciated, in an unassembled state the function of the calibration legs may be switched such that in a new configuration the "vertical" calibration legs may be positioned in a "horizontal" orientation or the "horizontal" calibration legs may be positioned in a "vertical" orientation.

Each of the vertical calibration legs 910 has a vertical length, VL, that spans between opposite ends. Near each of the opposite ends of the vertical calibration legs 910 are two holes 918 sized to receive a fastener 919 or other types of fasteners, as described below. Each of the horizontal calibration legs 912 has a horizontal length, HL, that spans between opposite ends. Near each of the opposite ends of the horizontal calibration legs 912 are two holes 922 sized to receive the fastener 919 or other types of fasteners, as described below. The holes 918 and 922 may be the same size which would beneficially enable uniformity in the types of fasteners assembled therewith. For alternative reasons, the holes 918 and 922 may be sized differently such as to enable assembly with different types of fasteners.

Illustrated in FIG. 9, the vertical calibration legs 910 are detached from the horizontal calibration legs 912 to facilitate storage or transport between construction sites or locations. The vertical calibration legs 910 can be assembled with the horizontal calibration legs 912 at a plurality of joint locations 920 to form the calibration rig 904 for installation at a construction site on the work surface 901. In the illustrated embodiment, the plurality of joint locations 920 each include one of either a first calibration joint locator 930, a second calibration joint locator 932, or a third calibration joint locator 934 to facilitate assembly of one or more of the vertical calibration legs 910 with the one or more of the horizontal calibration legs 912 in a right or 90 degree angles. The first, second, and/or third calibration joint locators 930, 932, or 934, increase the speed and accuracy with which the vertical calibration legs 910 can be assembled with the horizontal calibration legs 912 to form the calibration rig 904. The first, second, and/or third calibration joint locators 930, 932, or 934 are described in more detail below. Various types of fasteners 919, such as bolts, screws, wingnuts, pivoting mechanisms, or other fasteners may be used at the plurality of joint locations 920 that include any of the first, second, and/or third calibration joint locators 930, 932, or 934 to enable attachment or connectivity between the individual vertical and horizontal calibration legs 910 and 912 to form the calibration rig 904.

The plurality of vertical calibration legs 910 are connected, attached, or intersect with the plurality of horizontal calibration legs 912 at the plurality of joint locations 920 wherein a spacing SV between two adjacent joint locations 920 is the same along the length of the vertical calibration legs 910. A spacing SH between two adjacent joint locations 920 is also the same along the length of the plurality of horizontal calibration legs 912. The plurality of vertical calibration legs 910 are assembled with the plurality of horizontal calibration legs 912 so that the spacing SV is equivalent to the spacing SH. In other forms, the plurality of vertical calibration legs 910 are assembled with the plurality of horizontal calibration legs 912 so that the spacing SV is not equivalent to the spacing SH. In the expanded configuration for the calibration rig 904, the plurality of vertical calibration legs 910 are arranged at right or 90 degree angles to the plurality of horizontal calibration legs 912 to form a calibration grid 950.

The plurality of vertical calibration legs 910 include perimeter vertical members 960 and the plurality of horizontal calibration legs 912 include perimeter horizontal members 970. The perimeter vertical members 960 connect with the perimeter horizontal members 970 at the joint locations 920 to form a square shape in the illustrated embodiment.

The plurality of vertical calibration legs 910 include interior vertical members 980 and the plurality of horizontal calibration legs 912 include interior horizontal members 990. The interior vertical members 980 are connected to the perimeter horizontal members 970 at the joint locations 920 such that a right angle or 90 degree angle exists between the interior vertical members 980 and the perimeter horizontal members 970 when the calibration rig 904 is in the expanded configuration. The interior horizontal members 990 are connected to the perimeter vertical members 960 at the joint locations 920 such that a right angle or 90 degree angle exists between the interior horizontal members 990 and the perimeter vertical members 960 when the calibration rig 904 is in the expanded configuration.

Figure 12:
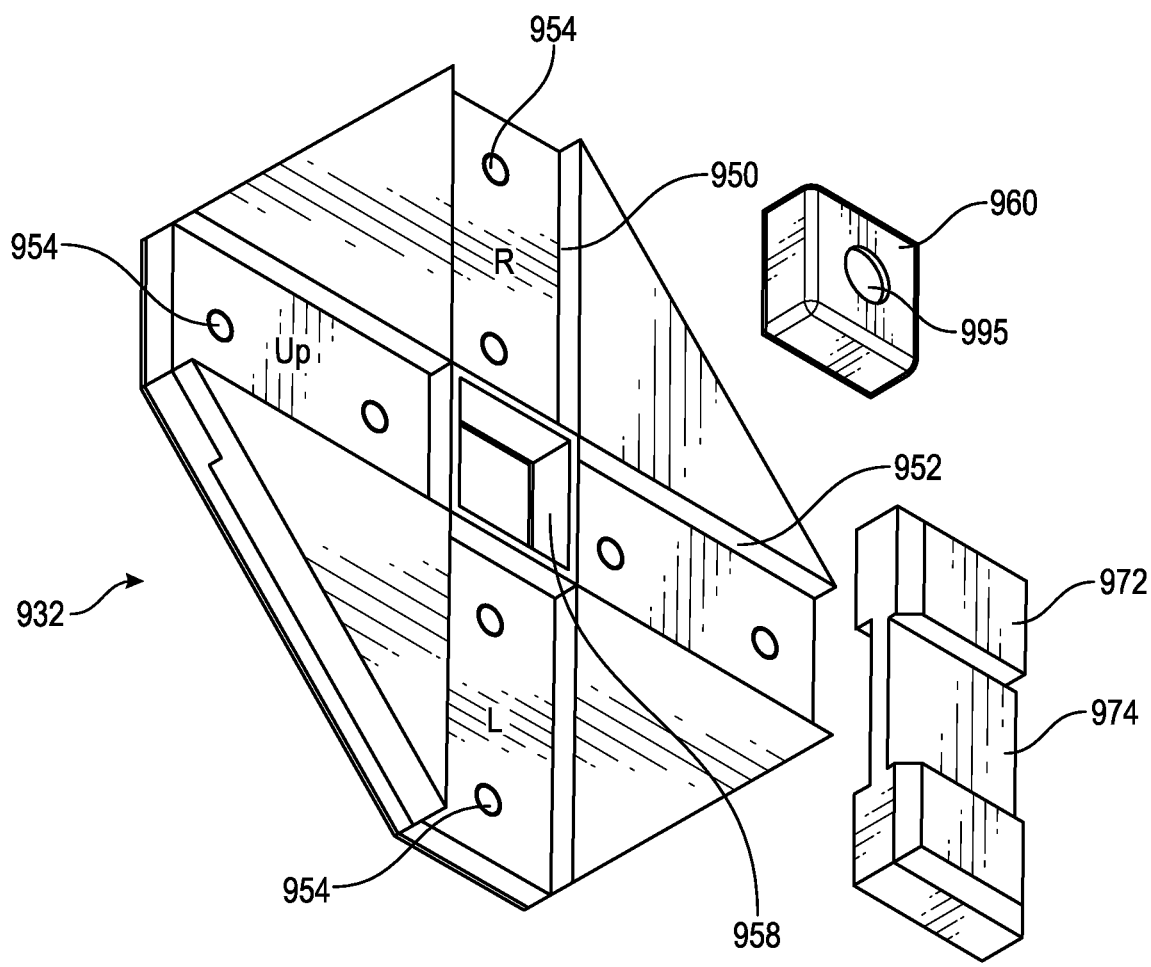
FIG. 12 is a perspective view of a second calibration joint locator.

In the illustrated embodiment of FIG. 8, the calibration rig 904 includes a support 972 associated with each of the vertical calibration legs 910 and the horizontal calibration legs 912. In other embodiments, the calibration rig 904 may not include the support 972 or include fewer of the supports 972 such that not all of the vertical and horizontal calibration legs 910 and 912 are associated with the support 972. As illustrated in FIG. 12, the support 972 includes a support groove 974 that is sized to receive either the vertical or horizontal calibration leg 910 or 912 therein. The support 972 functions to support the vertical or horizontal calibration leg 910 or 912 to elevate the vertical or horizontal calibration leg 910 or 912 away from the work surface 901.

Figure 11:
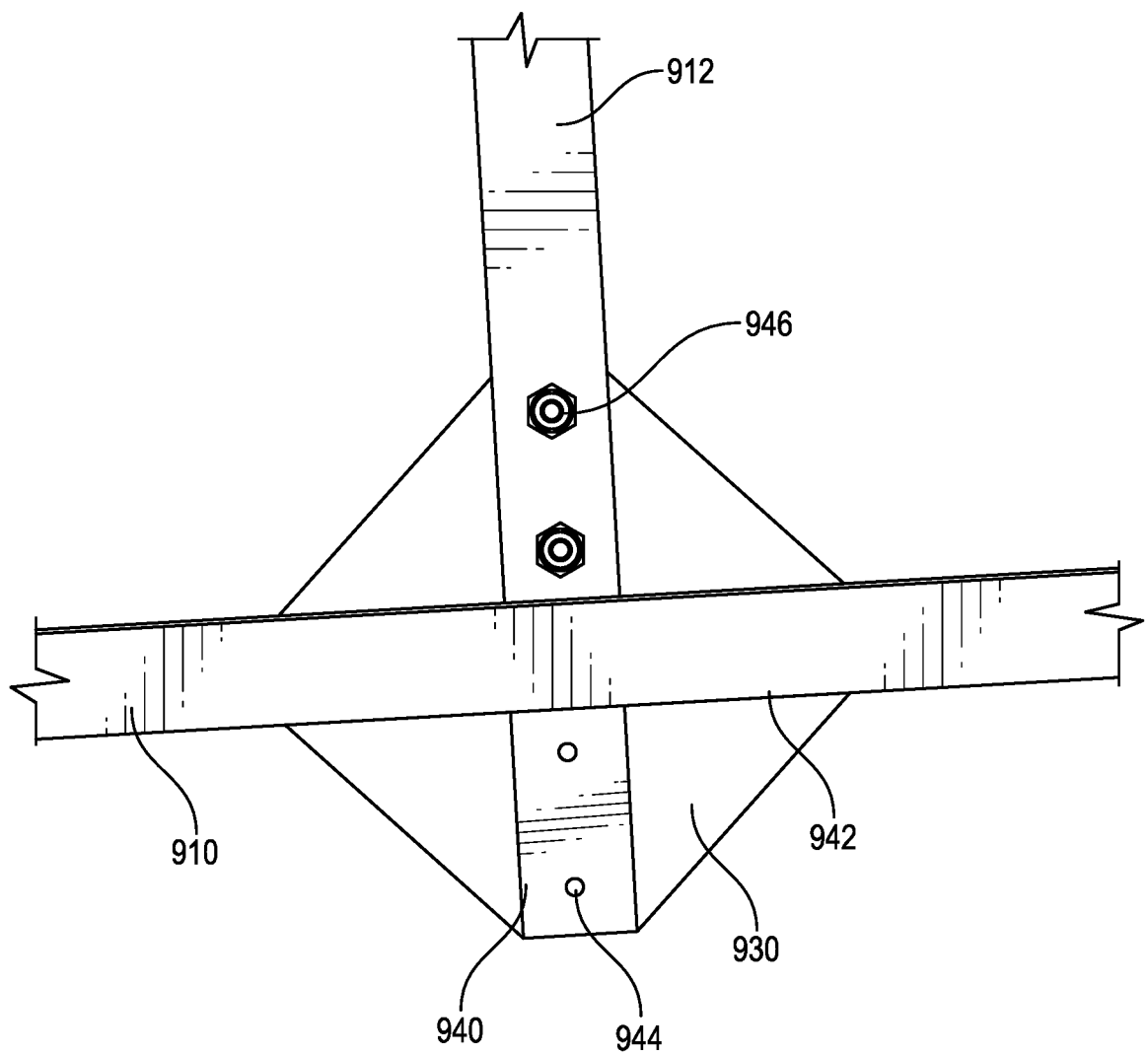
FIG. 11 is a top view of the first calibration joint locator from FIG. 10 embodiment.

Turning now to the first calibration joint locator 930 is illustrated in FIGS. 11 and 12. The first calibration joint locator 930 includes a first groove 940 that intersects a second groove 942 at a 90 degree angle. The first and second grooves 940 and 942 are sized to receive the vertical and horizontal calibration legs 910 and 912 therein as illustrated in FIG. 11. The first calibration joint locator 930 can be used as a spacer wherein the lengths of the vertical and horizontal calibration legs 910 and 912 are known to thereby provide exact spacing for squaring the calibration rig 904 and in particular for squaring the horizontal calibration leg 912 to the vertical calibration leg 910. In one form, the first calibration joint locator 930 includes one or more calibration holes 944 sized to receive an anti-vibration fastener 946 to hold the horizontal calibration leg 912 or the vertical calibration leg 910 to the first calibration joint locator 930. In the illustrated embodiment, the first calibration joint locator 930 includes a center calibration hole 958 for calibration with the laser 302 and the calibration rig 904. As can be appreciated, while the horizontal and/or vertical legs 912 and 910 are assembled with the first calibration joint locator 930 at 90 degree angles, the calibration rig 904 can be calibrated at a very good accuracy and very quickly since the lengths of the horizontal and/or vertical legs 912 and 910 are known and the 90 degree angles are maintained via the assembly of the legs 912 and 910 with the first calibration joint locator 930.

Figure 13:
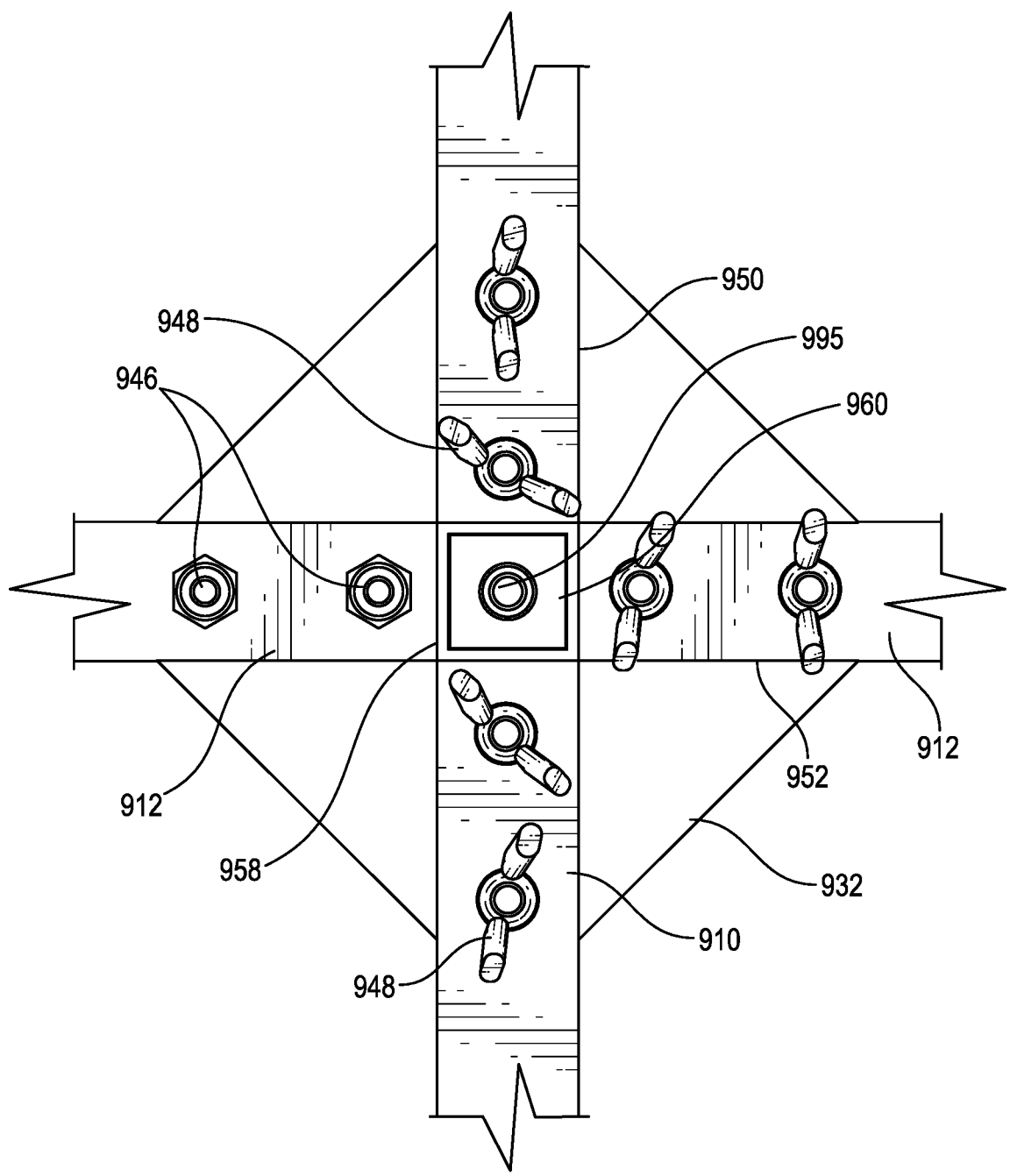
FIG. 13 is a top view of the second calibration joint locator from FIG. 12 embodiment.
Figure 14:
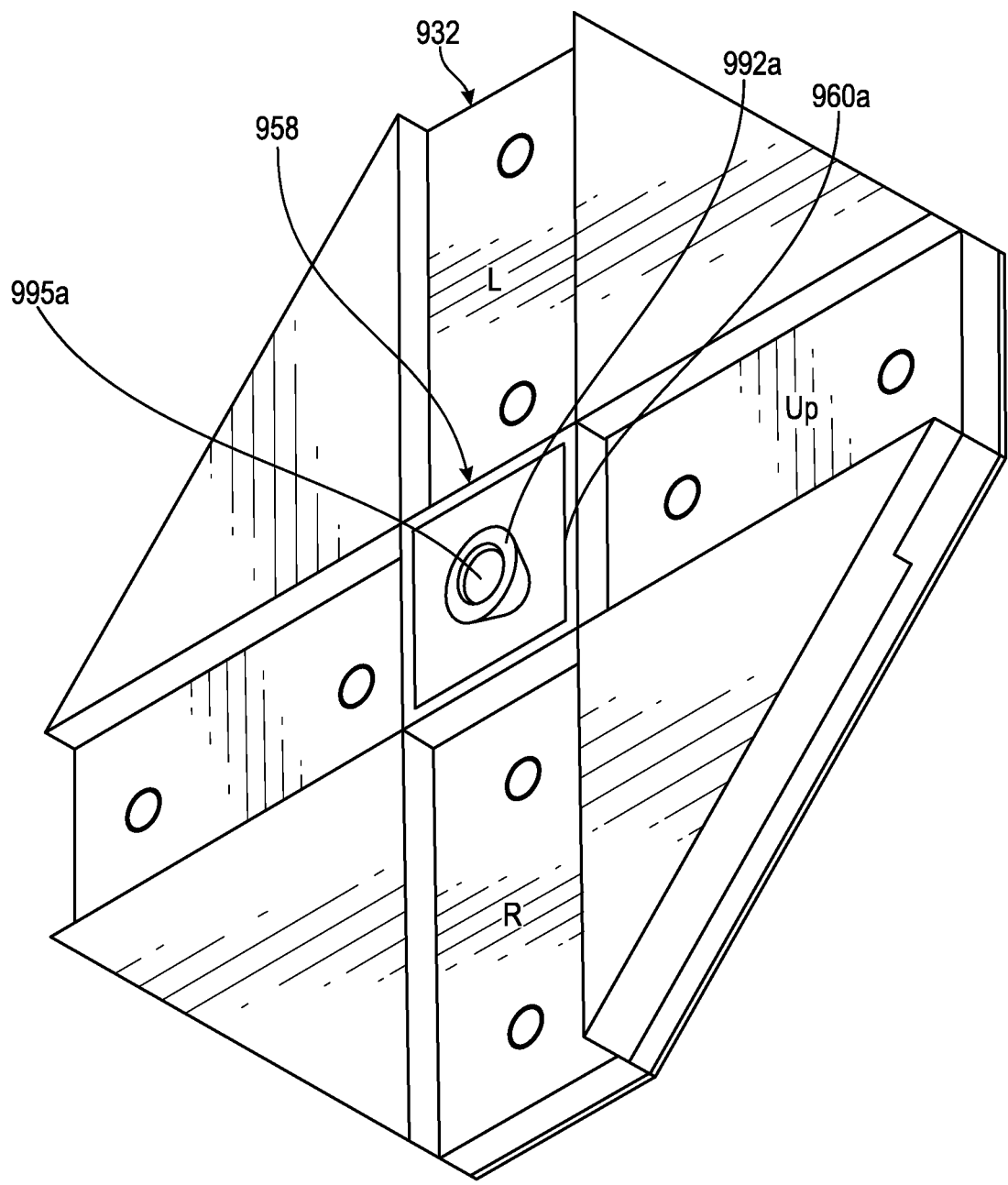
FIG. 14 is a perspective view of the second calibration joint locator assembled with a control point insert.

The second calibration joint locator 932 is illustrated in FIGS. 13 and 14. The second calibration joint locator 932 includes a first groove 950 that intersects a second groove 952. The first and second grooves 950 and 952 are sized to receive the vertical and horizontal calibration legs 910 and 912 therein as illustrated in FIG. 13. In one form, the second calibration joint locator 932 includes one or more calibration holes 954 sized to receive an anti-vibration fastener 946 to hold or attach the vertical calibration leg 910 or the horizontal calibration leg 912 to the second calibration joint locator 932. The one or more calibration holes 954 are sized to receive other fastener types such as a quick release wingnut or bolt 948 to hold or attach the vertical calibration leg 910 or the horizontal calibration leg 912 to the second calibration joint locator 932. The quick release wingnut or bolt 948 can be unfastened from the horizontal or vertical calibration legs 912 or 910 to release the legs 912 or 910 from the second calibration joint locator 932 such as to disassemble the legs 912 or 910 from the second calibration joint locator 932. In the illustrated embodiment, the second calibration joint locator 932 includes a center calibration hole 958 sized to receive a control point insert 960, described in more detail below.

The control point insert 960 can be inserted or positioned in the center calibration hole 958. The control point insert 960 includes a reflective calibration locator 995 that is similar to the calibration locator 396. The reflective calibration locator 995 can be made of any reflective material that is compatible with the laser 302. In one form, the reflective calibration locator 995 is made of reflective tape or includes another type of adhesive. In some embodiments, the control point insert 960 includes a bottom surface that is configured to adhere or stick to the work surface 901. As such, the second calibration joint locator 932 can be removed from the control point insert 960 such that the control point insert 960 remains adhered or attached to the work surface 901 and the control point insert 960 can function as a benchmark for construction. This is beneficial as the second calibration joint locator 932 can be calibrated with the horizontal and vertical calibration legs 912 and 910 and thereafter control point insert 960 can be adhered to the work surface 901. In one form, the control point insert 960 is be adhered to the work surface 901 using double stick tape or other adhesive. It is beneficial to protect the control point insert 960 like any other benchmark in the construction field for future use without the calibration rig 904. The control point insert 960 can be used as a reference point on the work surface 901 and as an exact location of the calibration rig 904. The control point insert 960 can adhere or attach to the work surface 901 once the corresponding second calibration joint locator 932 is calibrated, then the calibration rig 904 can slide over the adhered control point insert 960 to expand the calibration area and maintain the accuracy of the calibration grid 950.

Figure 15:
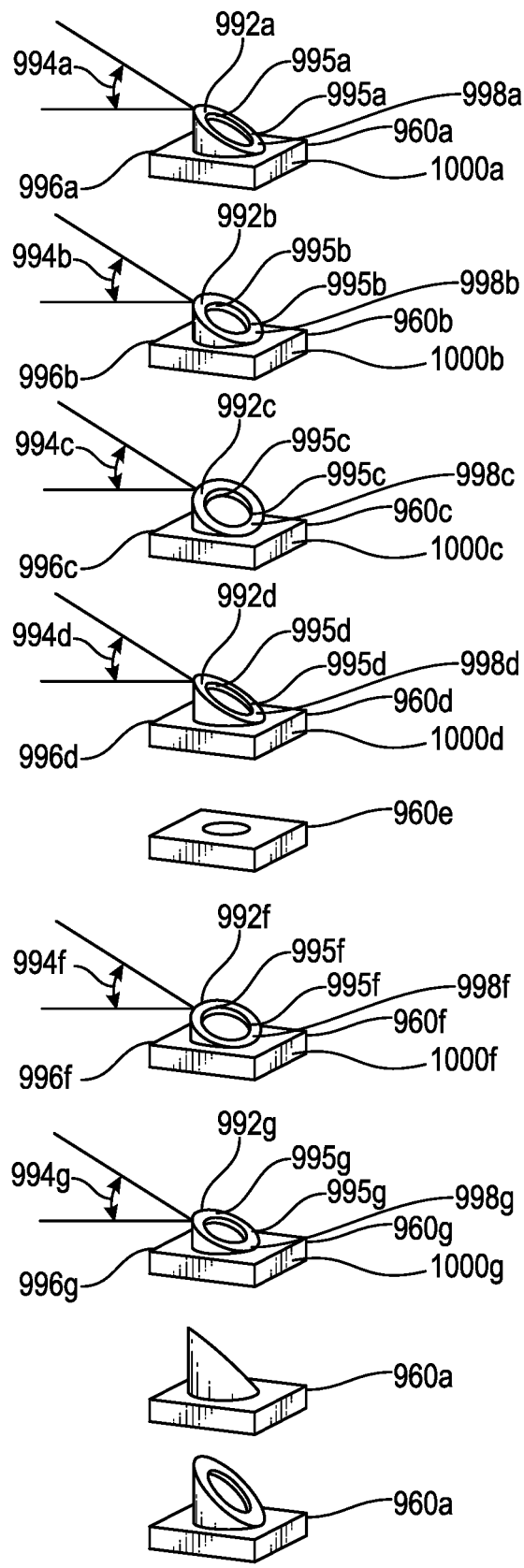
FIG. 15 is a perspective view of a plurality of control point inserts.

The second calibration joint locator 932 is also illustrated in FIG. 14. Another embodiment of the control point insert 960a is illustrated in FIGS. 15 and 16. The control point insert 960a is similar to the control point insert 960 unless noted otherwise. The control point insert 960a includes a raised surface marker 992a that is defined by a control angle 994a that is measured relative to a control horizontal surface 996a and a control angled surface 998a. The control angle 994a is 22.5 degrees. The raised surface marker 992a includes a reflective calibration locator 995a. The raised surface marker 992a is rotated relative to a front side 1000a and in the illustrated embodiment the angle of rotation is about 22.5 degrees.

Another embodiment of the control point insert 960b is illustrated in FIG. 15. The control point insert 960b is similar to the control point insert 960 unless noted otherwise. The control point insert 960b includes a raised surface marker 992b that is defined by a control angle 994b that is measured relative to a control horizontal surface 996b and a control angled surface 998b. The control angle 994b is 22.5 degrees. The raised surface marker 992b includes a reflective calibration locator 995b. The raised surface marker 992b is perpendicular to a front side 1000b and in the illustrated embodiment.

Another embodiment of the control point insert 960c is illustrated in FIG. 15. The control point insert 960c is similar to the control point insert 960 unless noted otherwise. The control point insert 960c includes a raised surface marker 992c that is defined by a control angle 994c that is measured relative to a control horizontal surface 996c and a control angled surface 998c. The control angle 994c is 45 degrees. The raised surface marker 992c includes a reflective calibration locator 995c. The raised surface marker 992c is rotated relative to a front side 1000c and in the illustrated embodiment the angle of rotation is about 22.5 degrees.

Another embodiment of the control point insert 960d is illustrated in FIG. 15. The control point insert 960d is similar to the control point insert 960 unless noted otherwise. The control point insert 960d includes a raised surface marker 992d that is defined by a control angle 994d that is measured relative to a control horizontal surface 996d and a control angled surface 998d. The control angle 994d is 45 degrees. The raised surface marker 992d includes a reflective calibration locator 995d. The raised surface marker 992d is perpendicular to a front side 1000d.

Another embodiment of the control point insert 960e is illustrated in FIG. 15. The control point insert 960e is similar to the control point insert 960 unless noted otherwise. The control point insert 960e includes a reflective calibration locator 995e.

Another embodiment of the control point insert 960f is illustrated in FIG. 15. The control point insert 960f is similar to the control point insert 960 unless noted otherwise. The control point insert 960f includes a raised surface marker 992f that is defined by a control angle 994f that is measured relative to a control horizontal surface 996f and a control angled surface 998f. The control angle 994f is 22.5 degrees. The raised surface marker 992f includes a reflective calibration locator 995f. The raised surface marker 992f is rotated relative to a front side 1000f and in the illustrated embodiment the angle of rotation is about 22.5 degrees.

Another embodiment of the control point insert 960g is illustrated in FIG. 15. The control point insert 960g is similar to the control point insert 960 unless noted otherwise. The control point insert 960g includes a raised surface marker 992g that is defined by a control angle 994g that is measured relative to a control horizontal surface 996g and a control angled surface 998g. The control angle 994g is 22.5 degrees. The raised surface marker 992g includes a reflective calibration locator 995g. The raised surface marker 992g is perpendicular to a front side 1000g.

Another embodiment of the control point insert 960h is illustrated in FIG. 15. The control point insert 960h is similar to the control point insert 960 unless noted otherwise. The control point insert 960h includes a raised surface marker 992h that is defined by a control angle 994h that is measured relative to a control horizontal surface 996d and a control angled surface 998h. The control angle 994h is 45 degrees. The raised surface marker 992h includes a reflective calibration locator 995h. The raised surface marker 992h is rotated relative to a front side 1000h and in the illustrated embodiment the angle of rotation is about 45 degrees.

Another embodiment of the control point insert 960i is illustrated in FIG. 15. The control point insert 960i is similar to the control point insert 960 unless noted otherwise. The control point insert 960i includes a raised surface marker 992i that is defined by a control angle 994i that is measured relative to a control horizontal surface 996i and a control angled surface 998i. The control angle 994i is 45 degrees. The raised surface marker 992i includes a reflective calibration locator 995i. The raised surface marker 992i is perpendicular to a front side 1000i.

The control angles 994a-i can be any angle that is beneficial for use with the laser 302. The raised surface markers 992a-i can be any angle relative to the corresponding front sides 1000a-i that is beneficial for use with the laser 302.

A calibration system 900 includes the laser 302 and the calibration rig 904 illustrated in FIG. 8. Installation of the calibration system 900 is similar to the calibration system 300, unless noted otherwise.

The calibration rig 904 is squared to the work surface 901, all of the plurality of vertical calibration legs 910 and the plurality of horizontal calibration legs 912 are positioned at 90-degree angles to each other. The squaring of the vertical and horizontal legs 910 and 912 is quickly accomplished by assembling the vertical and horizontal legs 910 and 912 with the corresponding first, second, and/or third calibration joint locators 930, 932, or 934 and corresponding fasteners 919 or 946. One of the control point inserts 960 or 960a-i is assembled with the second or third calibration joint locators 932 or 934.

In the embodiment illustrated in FIG. 8, the laser 302 determined a calibration accuracy of 0.002 feet, or 0.024 inches, or less than 1 mm. The calibration accuracy of the calibration rig 904 is between 0.00 and 0.001 feet, and the controller 399 can determine location of the reflective calibration locators 995*a-i* in an X and Y direction and how level the work surface 901 is in the Z direction.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A calibration rig comprising:
   a plurality of vertical calibration legs;
   a plurality of horizontal calibration legs;
   a plurality of calibration joint locators, wherein each of the calibration joint locators includes a first groove that intersects a second groove at a 90 degree angle, the first and the second grooves each sized to receive at least one of the plurality of the vertical legs and/or at least one of the plurality of horizontal legs in an assembled state, wherein each of the calibration joint locators defines a center hole positioned at an intersection of the first and second grooves, wherein the center hole extends through the calibration joint locator; and
   a plurality of control point inserts, each of the control point inserts has a bottom surface that attaches to a work surface, wherein the control point inserts are sized to fit within the center holes of the calibration joint locators in the assembled state, further wherein the calibration joint locators, the plurality of vertical legs, and the plurality of horizontal legs are removed from the control point inserts in a disassembled state, so that the control point inserts function as a benchmark for construction.

2. The calibration rig of claim 1, wherein each of the control point inserts includes a reflective calibration marker.

3. The calibration rig of claim 1, further comprising:
   a support having a support groove wherein the support groove is sized to receive one of the calibration legs therein.

4. The calibration rig of claim 1, wherein the plurality of vertical calibration legs and the plurality of horizontal calibration legs are made of aluminum bars, steel, hardened steel, carbon fiber, or plastic.

5. The calibration rig of claim 1, wherein the plurality of vertical calibration legs and the plurality of horizontal calibration legs are made of collapsible segments that facilitate collapse of the legs.

6. The calibration rig of claim 1, wherein each of the control point inserts includes a raised surface marker that is defined by a control angle, wherein the control angle is measured relative to a control horizontal surface and a control angled surface of the control point insert.

7. The calibration rig of claim 6, wherein control angle is between 22 and 60 degrees.

8. The calibration rig of claim 6, wherein the raised surface marker is rotated relative to a front side of each of the control point inserts.

9. The calibration rig of claim 6, wherein the angle of rotation relative to the front side is between 22 and 60 degrees.

10. A calibration rig comprising:
    a plurality of calibration legs, the calibration legs are connected relative to one another to form a 90 degree angle between two of the calibration legs at a joint location in an assembled state;
    a plurality of calibration joint locators wherein one of the calibration joint locators is positioned at one or more of the joint locations where two or more of the plurality of calibration legs are assembled, wherein each of the calibration joint locators defines a center hole positioned at the joint location, wherein the center hole extends through the calibration joint locator; and
    a plurality of control point inserts, each of the control point inserts has a bottom surface that attaches to a work surface, wherein the control point inserts are sized to fit within the center holes of the calibration joint locators in the assembled state, further wherein the calibration joint locators and the plurality of calibration legs are removed from the control point inserts in a disassembled state, so that the control point inserts function as a benchmark for construction.

11. The calibration rig of claim 10, further comprising:
wherein each of the plurality of calibration joint locators includes one or more joint locator holes;
wherein each of the plurality of calibration legs includes one or more calibration leg holes positioned to align with the one or more joint locator holes when one of the plurality of calibration joint locators is assembled with one of the plurality of calibration legs; and
a plurality of fasteners assembled with the leg holes and the joint locator holes to connect the plurality of calibration joint locators with the plurality of calibration legs.

12. The calibration rig of claim 10, wherein each of the calibration joint locators includes a first groove that intersects a second groove at a 90 degree angle, the first and the second grooves each sized to receive at least one of the plurality of the calibration legs.

13. The calibration rig of claim 10, wherein at least one of the one or more control point inserts includes a reflective calibration marker.

14. The calibration rig of claim 10, further comprising:
a support having a support groove wherein the support groove is sized to receive one of the calibration legs therein.

* * * * *